United States Patent
Jain (10) Patent No.: US 11,757,732 B2
(45) Date of Patent: Sep. 12, 2023

(54) PERSONALIZED SERVERLESS FUNCTIONS FOR MULTITENANT CLOUD COMPUTING ENVIRONMENT

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 16/928,437

(22) Filed: Jul. 14, 2020

(65) Prior Publication Data
US 2021/0367862 A1 Nov. 25, 2021

(30) Foreign Application Priority Data
May 21, 2020 (IN) .............................. 202011021377

(51) Int. Cl.
| | |
|---|---|
| H04L 12/24 | (2006.01) |
| H04L 41/5041 | (2022.01) |
| G06F 9/50 | (2006.01) |
| H04L 41/50 | (2022.01) |
| G06N 20/00 | (2019.01) |
| G06F 9/52 | (2006.01) |
| G06N 7/01 | (2023.01) |

(52) U.S. Cl.
CPC ........ *H04L 41/5048* (2013.01); *G06F 9/5083* (2013.01); *G06F 9/52* (2013.01); *G06N 7/01* (2023.01); *G06N 20/00* (2019.01); *H04L 41/5096* (2013.01)

(58) Field of Classification Search
CPC ............. H04L 41/5048; H04L 41/5096; H04L 41/5054; H04L 43/0852; H04L 43/0876; H04L 41/0806; H04L 41/0896; H04L 41/0823; G06F 9/5083; G06F 9/52; G06N 7/005; G06N 20/00
See application file for complete search history.

(56) References Cited

U.S. PATENT DOCUMENTS

| | | | |
|---|---|---|---|
| 11,099,829 B2 * | 8/2021 | Sanchez .................... | G06F 8/65 |
| 2018/0349158 A1 * | 12/2018 | Swersky ............... | G06N 3/0472 |
| 2019/0123973 A1 * | 4/2019 | Jeuk ....................... | G06F 9/5027 |
| 2019/0281132 A1 * | 9/2019 | Sethuraman .......... | H04L 67/303 |

(Continued)

*Primary Examiner* — Gil H. Lee
*Assistant Examiner* — Juan C Turriate Gastulo
(74) *Attorney, Agent, or Firm* — Buckley, Maschoff & Talwalkar LLC (57) ABSTRACT

A system and method are disclosed associated with a multi-tenant cloud computing environment. The system may receive information about a serverless function workload (e.g., a NodeJS, Java function or ABAP workload) to be launched in the cloud computing environment. A tenant associated with the serverless function workload to be launched may be identified and, based at least in part on the identified tenant, an objective function (e.g., throughput, latency, cost, etc.) for the serverless function workload to be launched may be identified. A recommendation service platform may then iteratively configure tuning parameters of the cloud computing environment using Bayesian optimization (e.g., to reach a global optimum using a Gaussian process) and the determined objective function. The system may then arrange for the serverless function workload to be executed in the cloud computing environment in accordance with the configured tuning parameters.

20 Claims, 11 Drawing Sheets

(56) References Cited

U.S. PATENT DOCUMENTS

2019/0312800 A1* 10/2019 Schibler .................... G06F 8/65
2020/0195520 A1* 6/2020 Guim Bernat .......... G06F 30/34
2022/0043822 A1* 2/2022 Möhler ................. G06F 16/256

* cited by examiner

PERSONALIZED SERVERLESS FUNCTIONS FOR MULTITENANT CLOUD COMPUTING ENVIRONMENT

CROSS-REFERENCE TO RELATED APPLICATIONS

The present application claims priority to Indian Provisional Application No. 202011021377, filed May 21, 2020, and incorporates said Indian Provisional Application by reference for all purposes.

BACKGROUND

An enterprise may use on premises systems and/or a cloud computing environment to run applications and/or to provide services. For example, serverless functions may be used to process purchase orders, handle human resources tasks, interact with customers, etc. Moreover, a cloud computer environment may support multiple tenants and/or users (e.g., various business may access and utilize an environment, such as a data center). Today, the configuration of serverless functions is not personalized based on a user's or tenant's requirements when the function is launched. Note that some functions might need high throughput while others need low latency. Other functions may want to optimize how much Input Output (10) is performed and still others might desire optimization based on cost. In current systems, a single configuration is applied for every function that is launched (irrespective of the tenants for which the function is supposed to run). In addition, some tenant functions might need more memory as compared to other functions, but these types of configurations are now performed statically. Moreover, the tenant might not even be aware of the details for a specific workload. Also, a serverless function could be executed on nodes/machines that have substantial variations in current properties (such as when other functions are executing on the same node and network conditions at same time). This can lead to sub-optimal execution of tenant workloads and lead to higher costs and a bad user experience.

Manually tuning characteristics for serverless function workloads, however, can be a time consuming and complicated task. For example, the enterprise might apply a substantial human effort to analyze various configurations to suggest a set of configuration parameters (e.g., using a combination of experience, estimation, and trial/error) based on the characteristics of a specific serverless function workload. It would therefore be desirable to automatically provide personalized serverless functions for a multi-tenant cloud computing environment in an efficient and accurate manner.

SUMMARY

According to some embodiments, methods and systems may facilitate automated personalized serverless functions in a multi-tenant cloud computing environment. The system may receive information about a serverless function workload (e.g., a NodeJS, Java function or ABAP workload) to be launched in the cloud computing environment. A tenant associated with the serverless function workload to be launched may be identified and, based at least in part on the identified tenant, an objective function (e.g., throughput, latency, cost, etc.) for the serverless function workload to be launched may be identified. A recommendation service platform may then iteratively configure tuning parameters of the cloud computing environment using Bayesian optimization (e.g., to reach a global optimum using a Gaussian process) and the determined objective function. The system may then arrange for the serverless function workload to be executed in the cloud computing environment in accordance with the configured tuning parameters.

Some embodiments comprise: means for receiving information about a serverless function workload to be launched in the cloud computing environment; means for identifying a tenant associated with the serverless function workload to be launched; based at least in part on the identified tenant, means for determining an objective function for the serverless function workload to be launched; means for iteratively configuring, by a recommendation service platform, tuning parameters of the cloud computing environment using Bayesian optimization and the determined objective function; and means for arranging for the serverless function workload to be executed in the cloud computing environment in accordance with the configured tuning parameters.

Some technical advantages of some embodiments disclosed herein are improved systems and methods associated with personalized serverless functions in a multi-tenant cloud computing environment in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
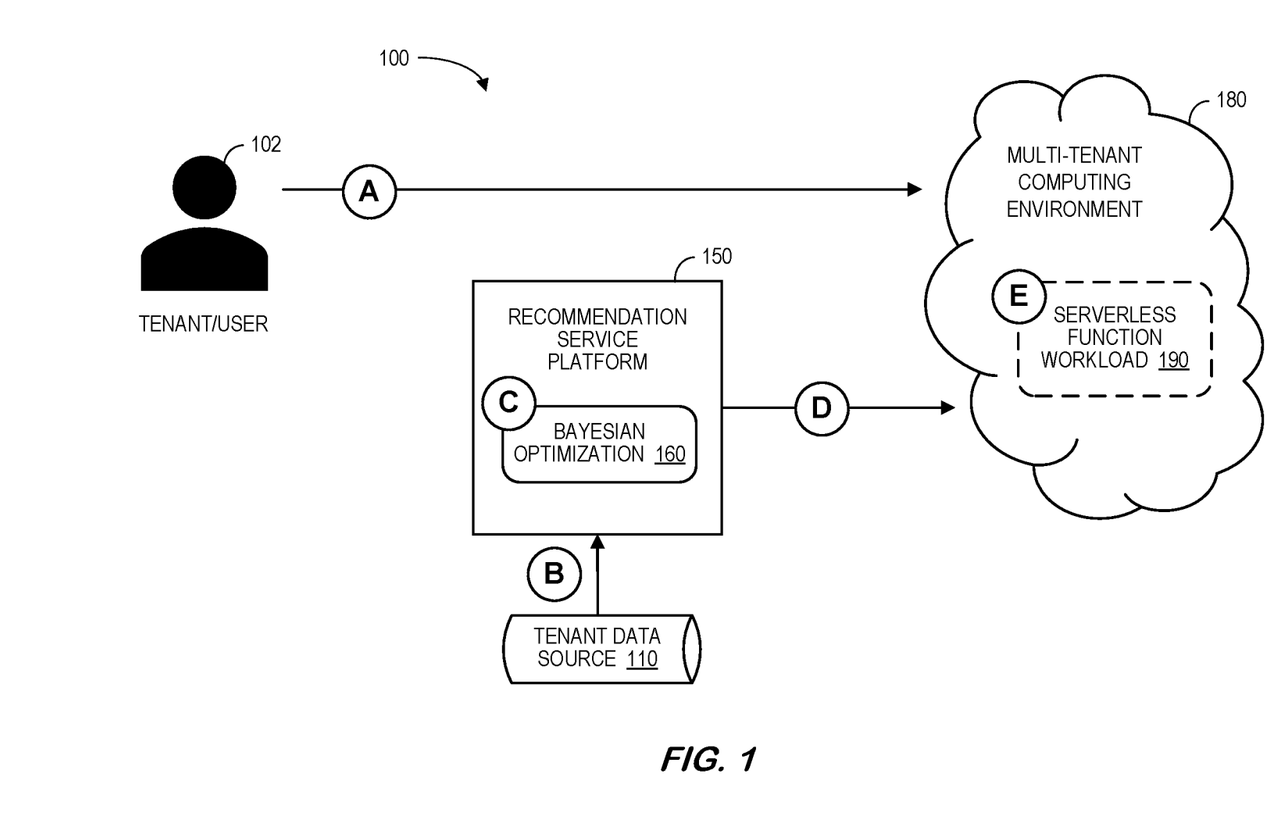
FIG. 1 is a high-level block diagram of a system in accordance with some embodiments.

FIG. 1 is a high-level block diagram of a database system 100 according to some embodiments. At (A), a tenant or user 102 may send a request to launch a "serverless function" to a multi-tenant cloud computing environment 180. As used herein, the phrase "serverless function" may refer to any serverless computing cloud computing execution model in which a cloud provider runs a server and dynamically manages allocation of machine resources. Pricing may be based on the actual amount of resources consumed by an application (instead of pre-purchased units of capacity). Note that serverless computing can simplify the process of deploying code into production (e.g., scaling, capacity planning, maintenance operations, etc. may be hidden from the tenant or user 102). According to some embodiments, serverless code may be used in conjunction with code deployed in traditional styles, such as microservices, or applications can be written to be purely serverless (and use no provisioned servers). Serverless function might be associated with compute runtimes, Function as a Service ("FaaS"), an AMAZON® Web Services ("AWS") Serverless Application Model ("SAM"), a serverless database (e.g., with a Relational Database Management System ("RDBMS"), etc.

An "automated" recommendation service platform 150 may receive information about the tenant/user 102 request and retrieve information from a tenant data source 110 at (B) (e.g., indicating an appropriate objective function to be used for an optimization). A used herein, the term "automated" may refer to a device or process that can operate with little or no human interaction. The recommendation service platform 150 may learn of the request, for example, from the multi-tenant cloud computing environment 180 or may handle the request for the tenant/user 102.

At (C), a Bayesian optimization 160 may execute at the recommendation service platform 150 based on the information retrieved from the tenant data source 110. The recommendation service platform 150 may then use results of the Bayesian optimization 160 to provide tuning parameters to the multi-tenant cloud computing environment 180 at (D). The multi-tenant cloud computing environment 180 can then execute the requested serverless function workload 190 in accordance with the tuning parameters at (E).

According to some embodiments, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store information into and/or retrieve information from various data stores (e.g., the tenant data source 110), which may be locally stored or reside remote from the recommendation service platform 150. Although a single recommendation service platform 150 is shown in FIG. 1, any number of such devices may be included. Moreover, various devices described herein might be combined according to embodiments of the present invention. For example, in some embodiments, the recommendation service platform 150 and tenant data source 110 might comprise a single apparatus. Some or all of the system 100 functions may be performed by a constellation of networked apparatuses, such as in a distributed processing or cloud-based architecture.

A user (e.g., a database administrator) may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to setup an optimization process) and/or provide or receive automatically generated recommendations or results from the system 100.

Thus, embodiments may provide a system of optimization that defines an objective function for a specific function and lets the system recommend configuration data for that objective. Consider, for example of a Java function that needs to be tuned to achieve a low latency. The configuration of the function might require tuning certain Java Virtual Machine ("JVM") parameters, such as a type of garbage collection (a process by which Java programs perform automatic memory management), a frequency of garbage collection, etc. Note that this configuration might vary from workload to workload. Another factor that might be considered in serverless environments is the variation in the context in which a function may be deployed. For example, a function might be placed on a machine that is currently experiencing network slowness or may have noisy neighbors (e.g., due to other tenant functions that are co-located that introduce noise into the system).

Embodiments may utilize a recommendation service for functions based on the Bayesian optimization 160 which is a relatively fast method to reach a global optimum using a relatively small number of iterations. The Bayesian optimization 160 may also deal with noise better than other optimization methodologies. By applying Bayesian optimization 160, the system 100 may derive a shape of tenant specific functions (modelled on the configuration of the runtime and process).

Note that embodiments may be generic enough to cater to functions shipped and executed via containers, unikernels, Web Assembly Modules ("WASM"). Moreover, personalized serverless functions can be associated with managed runtimes such as Java, Nodejs, Advanced Business Language Application Programming ("ABAP"), etc.

Figure 2:
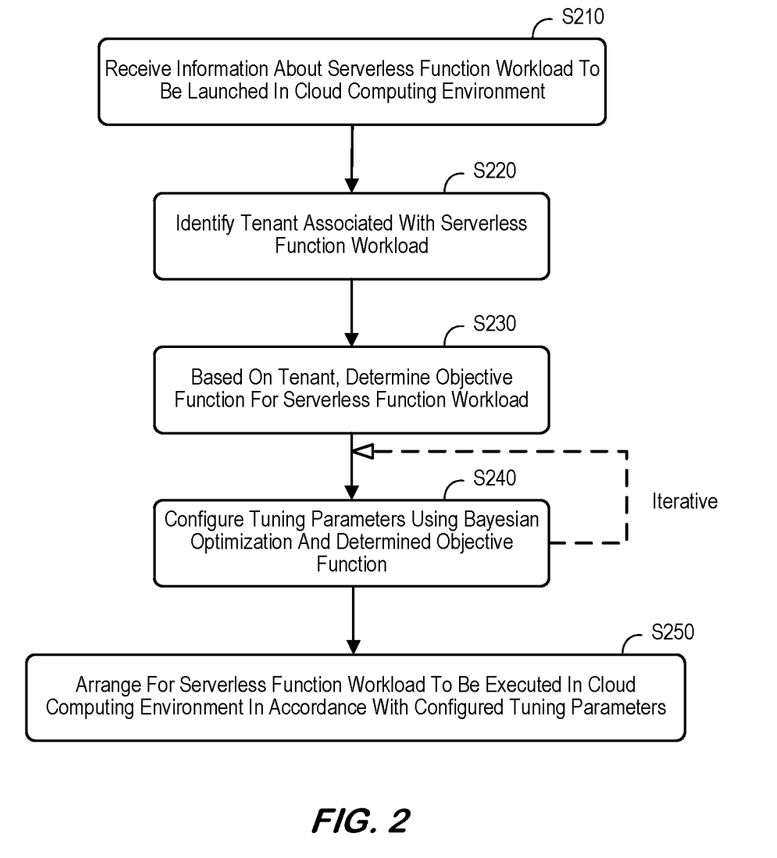
FIG. 2 illustrates a method to facilitate automated personalized serverless functions in a multi-tenant cloud computing environment according to some embodiments.

Embodiments may provide personalized software delivery where an objective function is defined per the tenant and the runtime and serverless function is configured for that specific tenant workload. FIG. 2 illustrates a method to facilitate automated personalized serverless functions in a multi-tenant cloud computing environment according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, the system may receive information about a serverless function workload to be launched in a cloud computing environment. The serverless function workload may be associated with a Java function, a serverless runtime, a serverless database, a Node.js workload, an ABAP workload, etc. Moreover, the serverless function workload might be associated with Kubernetes, containers, Virtual Machines ("VMs"), a unikernel, WASM, etc.

At S220, the system may identify a tenant associated with the serverless function workload to be launched. Based at least in part on the identified tenant, the system may determine an objective function for the serverless function workload to be launched at S230. The objective function might be associated with, for example, throughput, latency, IO characteristics, cost, a request rate, an amount of time, etc. According to some embodiments, the objective function is associated with any equation that uses multiple parameters (e.g., a ratio of parameters).

At S240, the system may configure tuning parameters of the cloud computing environment using Bayesian optimization and the determined objective function. Note that this may be an iterative process (as illustrated by the dashed arrow in FIG. 2) wherein the Bayesian optimization reaches a global optimum using a Gaussian process. Examples of tuning parameters include Central Processing Unit ("CPU") utilization, read IO ("IO") utilization, write IO utilization, memory utilization, disk utilization, heap size, for managed runtimes like Java, nodejs it can be garbage collection parameters, a garbage collection type, a survivor ratio etc. According to some embodiments, the tuning parameters are further configured based on context information about the serverless function workload and the cloud computing environment. In still other embodiments, the tenant is associated with multiple users, and the objective function is further determined based on a user associated with the serverless function workload to be launched. At S250, the system may arrange for the serverless function workload to be executed in the cloud computing environment in accordance with the configured tuning parameters.

As used herein, the term "Bayesian optimization" may refer to a non-parametric method that performs a relatively fast search in a substantial search space. Consider, for example, a search space that constitutes hundreds of parameters (e.g., for a system associated with ABAP or a Java runtime). The system may need to determine, for a specific function (e.g., a Business Application Programming Interface ("BAPI") or function module executing on the runtime) what optimal parameters (e.g., size of heap, CPUs needed, garbage collection parameters, etc.) should be used. In simple terms, the system may try to find or discover a function over these parameters that will lead to optimization of an objective function. The objective function might be, for example, to improve latency, increase throughput, minimize cost of execution, or any combination of such parameter. Because the search space can lead to combinatorial explosion and is exponential, a brute force approach can lead to a combinatorial explosion resulting in a Nondeterministic Polynomial time ("NP") hard problem (making such a computation intractable). Embodiments may instead approximate the function. One approach might be to use a neural network, but because there are so many parameters it may take an immense amount of resources (both in terms of compute utilization and time) to discover the optimal function as network would need immense amount of training in that case.

Figure 3:
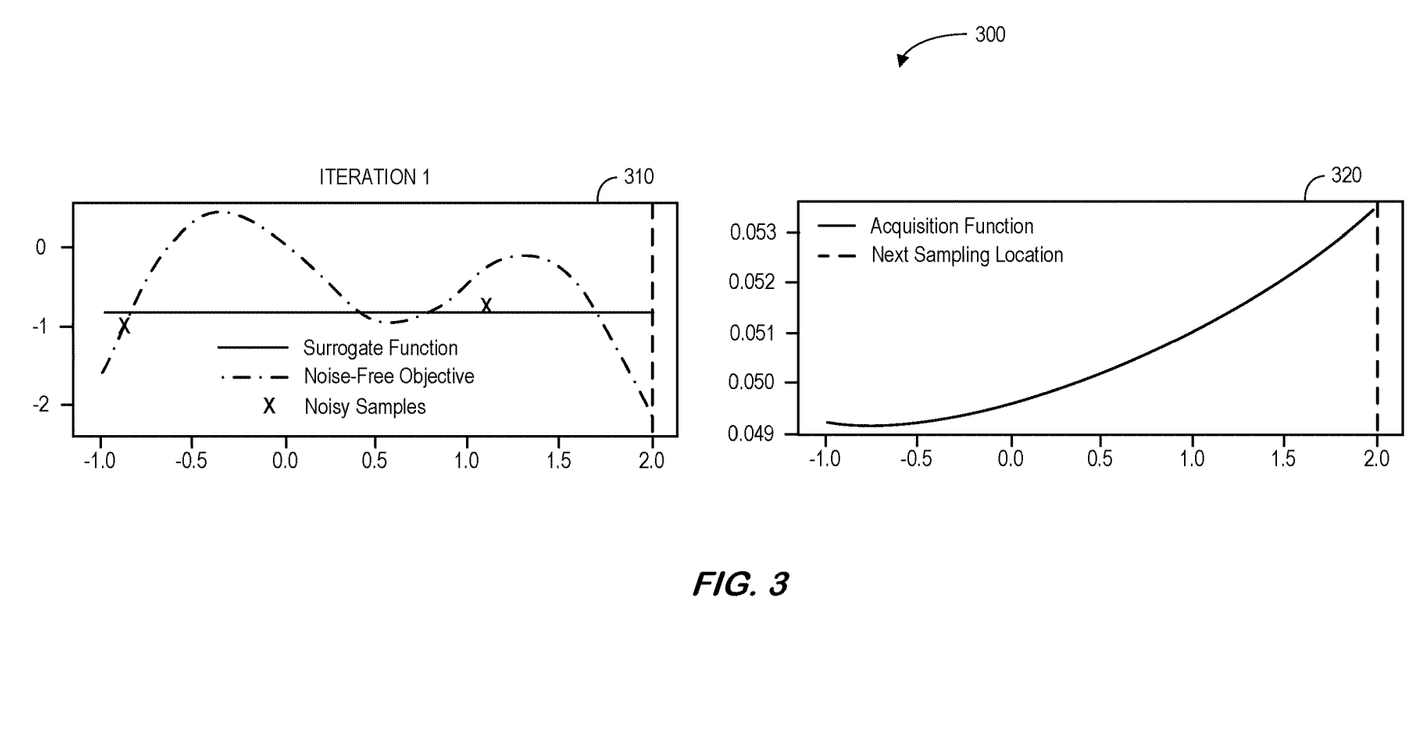
FIGS. 3 through 6 illustrate Bayesian optimization in accordance with some embodiments.

Instead, embodiments may utilize a Bayesian optimization that uses a Gaussian process to start with a Gaussian distribution over functions. As more and more observations are made, the functions may converge to an optimal value faster as compared to other approaches. Consider, for example, FIGS. 3 through 6 that illustrate Bayesian optimization in accordance with some embodiments. In particular, FIG. 3 shows 300 an initial iteration graph 310 ("iteration 1") and an associated acquisition function graph 320. In both graphs 310, 320, on the X-axis is the input parameter (e.g., an example of a single dimension or one parameter). In some cases, for example, the input parameter might be heap memory. On the Y-axis is the value of the optimized function (e.g., throughput). The iteration graph 310 shows a surrogate function (a solid line in FIG. 3), a noise-free objective (a dash-dotted line in FIG. 3), and noisy samples ("X" in FIG. 3). Both graphs 310, 320 show the next sampling location (dashed lines in FIG. 3).

Figure 4:
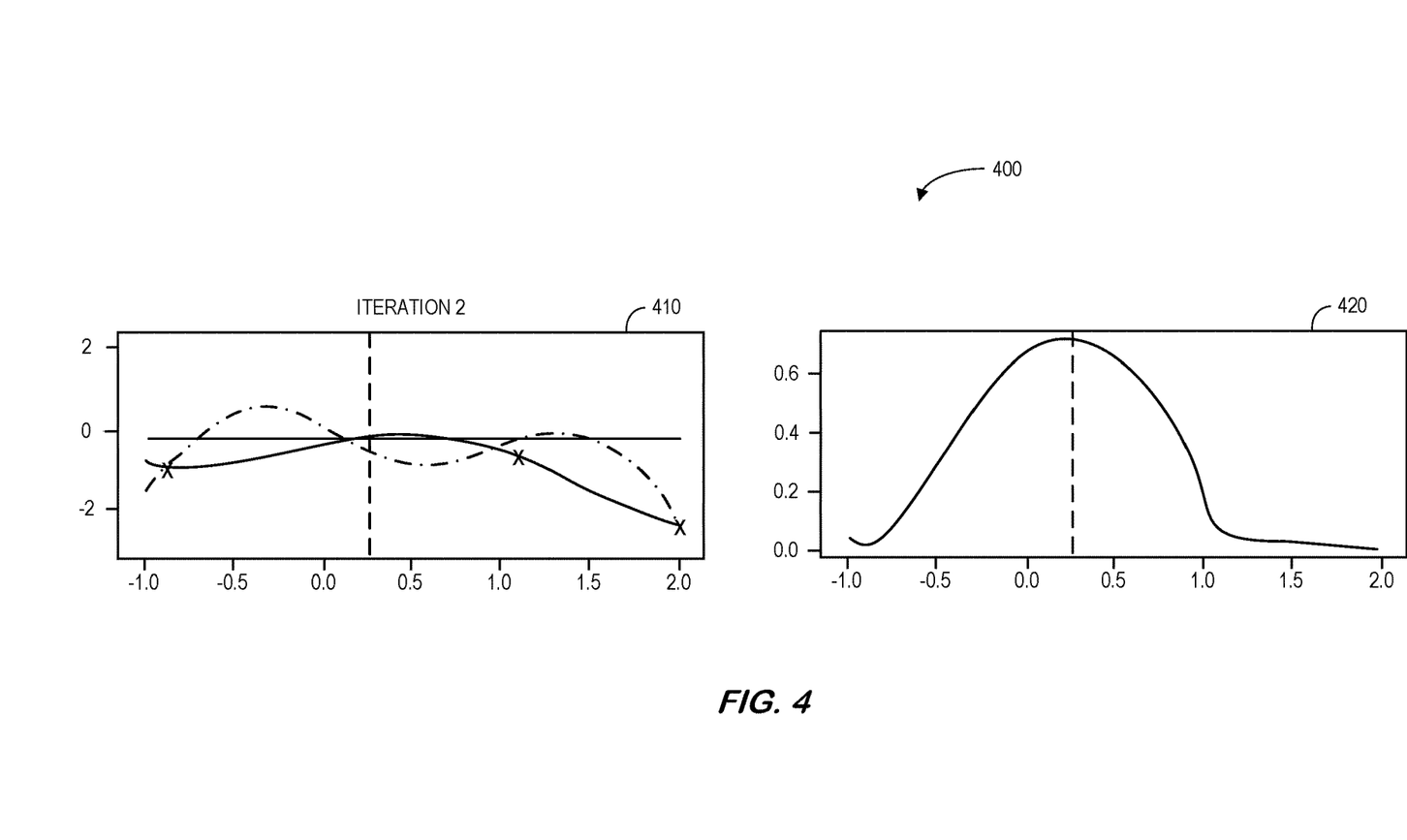
Figure 5:
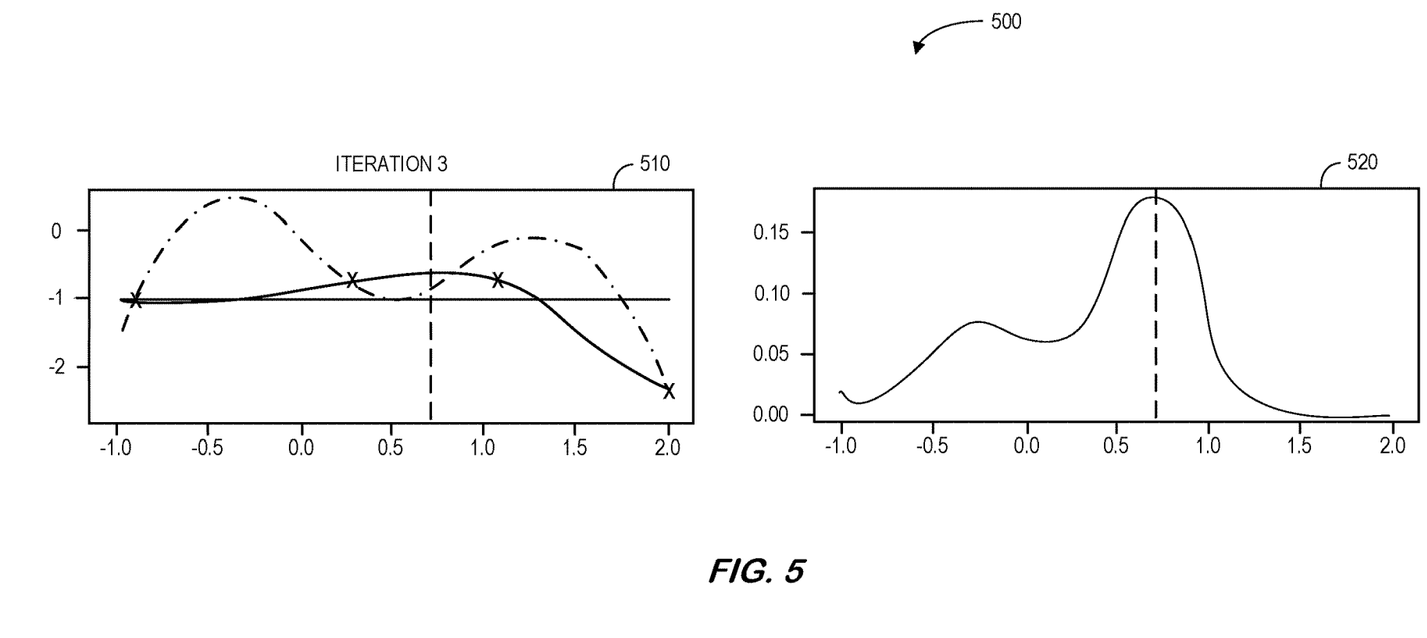
Figure 6:
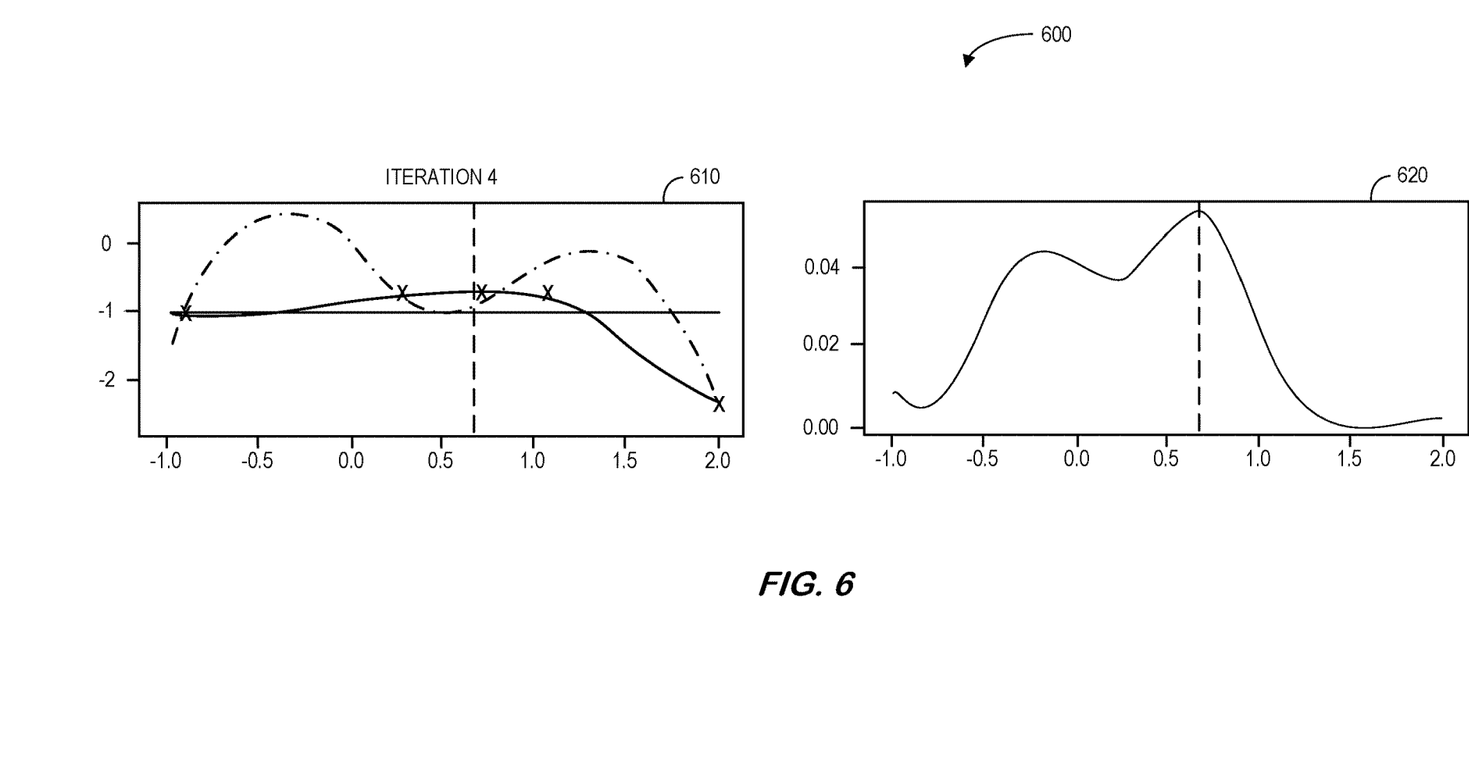

Similarly, FIG. 4 shows a second iteration graph 410 ("iteration 2") and an associated acquisition function graph 420. FIG. 5 shows a third iteration graph 510 ("iteration 3") and an associated acquisition function graph 520. FIG. 6 shows a fourth iteration graph 610 ("iteration 4") and an associated acquisition function graph 620. As can be seen, as more data points arrive the function starts to take shape towards reaching an optimal value. The Bayesian optimization approaches maxima/minima (depending on the goal) in as few as one hundred iterations generally, so it may be a suitable method for black box optimization.

Consider, for example a serverless function user who wants to optimize a function and selects an objective function (e.g., latency or throughput). This request alongside the function is fed into a recommendation service (e.g., a Bayesian optimization process) which takes the request and determines the appropriate runtime to run the function. The service may run some simulated workloads on the function code and attempt to derive the function fitting the objective function. In a relatively short period of time, the function converges and the service outputs runtime configurations for the function which allows it to meet the objective.

Figure 7:
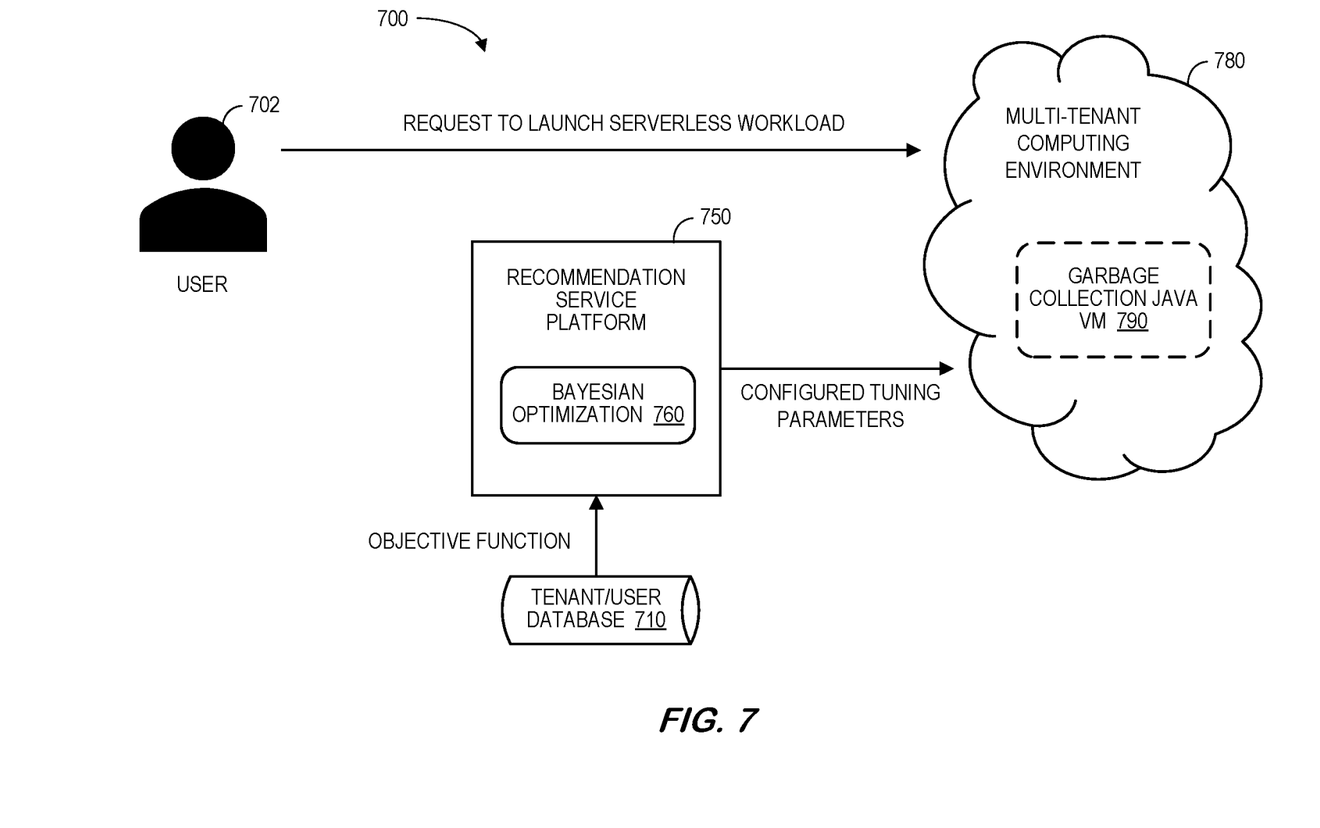
FIG. 7 is an example of a system in accordance with some embodiments.

FIG. 7 is an example of a system 700 in accordance with some embodiments. As before, a user 702 may send a request to launch a serverless function to a multi-tenant cloud computing environment 780. In this example, the serverless function is associated with a NodeJS VM for garbage collection. Such a serverless function may have several important configurable tuning knobs, such as:

a garbage collection type,
a survivor ratio,
Concurrent/Parallel
a number of concurrent garbage collection threads,
a number of parallel garbage collection threads, and An automated recommendation service platform 750 may receive information about the user 702 request and retrieve information from a tenant/user database 710 (e.g., indicating an appropriate objective function to be used for the optimization). By way of example, an objective function associated with garbage collection might include parameters such as:

a number of function executions per second, and
a time spent in garbage collection by the NodeJS runtime.

Note that in some cases, an objective function might be associated with a number of different parameters. In the garbage collection example, a ratio of two parameters might represent an objective function z to be maximized:

$$z = f(R, t_{GC}) = R/t_{GC}$$

where R is a number of function executions per second and $t_{GC}$ is a time spent in garbage collection.

A Bayesian optimization 760 may then execute at the recommendation service platform 750 based on the information retrieved from the tenant/user database 710. The Bayesian optimization 760 may run iterations (e.g., evaluations) that internally makes use of a Gaussian Process ("GP"). In the garbage collection example, the recommendations output by the Bayesian optimization might include:
- A specific type of GC like scavenge or mark sweep and compact,
- Heap size,
- an increased number of garbage collection threads, and The recommendation service platform 750 may then use results of the Bayesian optimization 760 to provide configured tuning parameters to the multi-tenant cloud computing environment 780. The multi-tenant cloud computing environment 780 can then execute the requested garbage collection NodeJS VM 790 in accordance with the configured tuning parameters.

According to some embodiments, when a function is registered with a platform it is mapped against a workload mapper by running variety of workloads against it to determine the workload category the function lies within. Until the time these simulations run, the function is not available for execution (e.g., during training phase for determining the workload type).

If the function involves IO activities (e.g., loading an image of size 2 MB from object storage) it will be mapped against a mix of IO read and CPU (processing of image) oriented workload (based on metrics obtained by tools) for a particular tenant or user. Assume, for example, that the system breaks this into 50% CPU and 50% IO based workloads. This mapping may then change over time as the system observes different patterns (e.g., when a big image is being loaded such as a 24 MB image) the access pattern (based on metrics) may show an increase in IO and might change from an equal mix of CPU and IO to a major IO-based pattern. This will again be used to recommend a new configuration for the function (e.g., 80% IO and 20% CPU utilization). Embodiments might not tailor recommendations for each and every execution but instead on a basis of percentiles (e.g., 99% of the function's workload is 80% IO and 20% CPU). The system may then read the specific configuration which is based on training of the NodeJS VM configuration for a specific workload type, tenant, and/or user. Note embodiments may use different workload types against which the system obtains configurations to satisfy the objective function.

The NodeJS VM 790 is only an example, and embodiments may be applied to any runtime including those associated with ABAP and/or a Linux kernel. In this way, embodiments may adjust a runtime for serverless applications giving a user personalized function that is tuned to that specific user's needs. This may also optimize resources from a resource scheduling perspective (e.g., because the system know exactly what resources are needed for a specific function). In some embodiments, business extensions may run on a KYMA runtime (a platform to extend applications with serverless functions and microservices via a selection of cloud-native projects) as serverless computes (and this may be a valid playground for optimizing business extensions and underlying runtimes).

Figure 8:
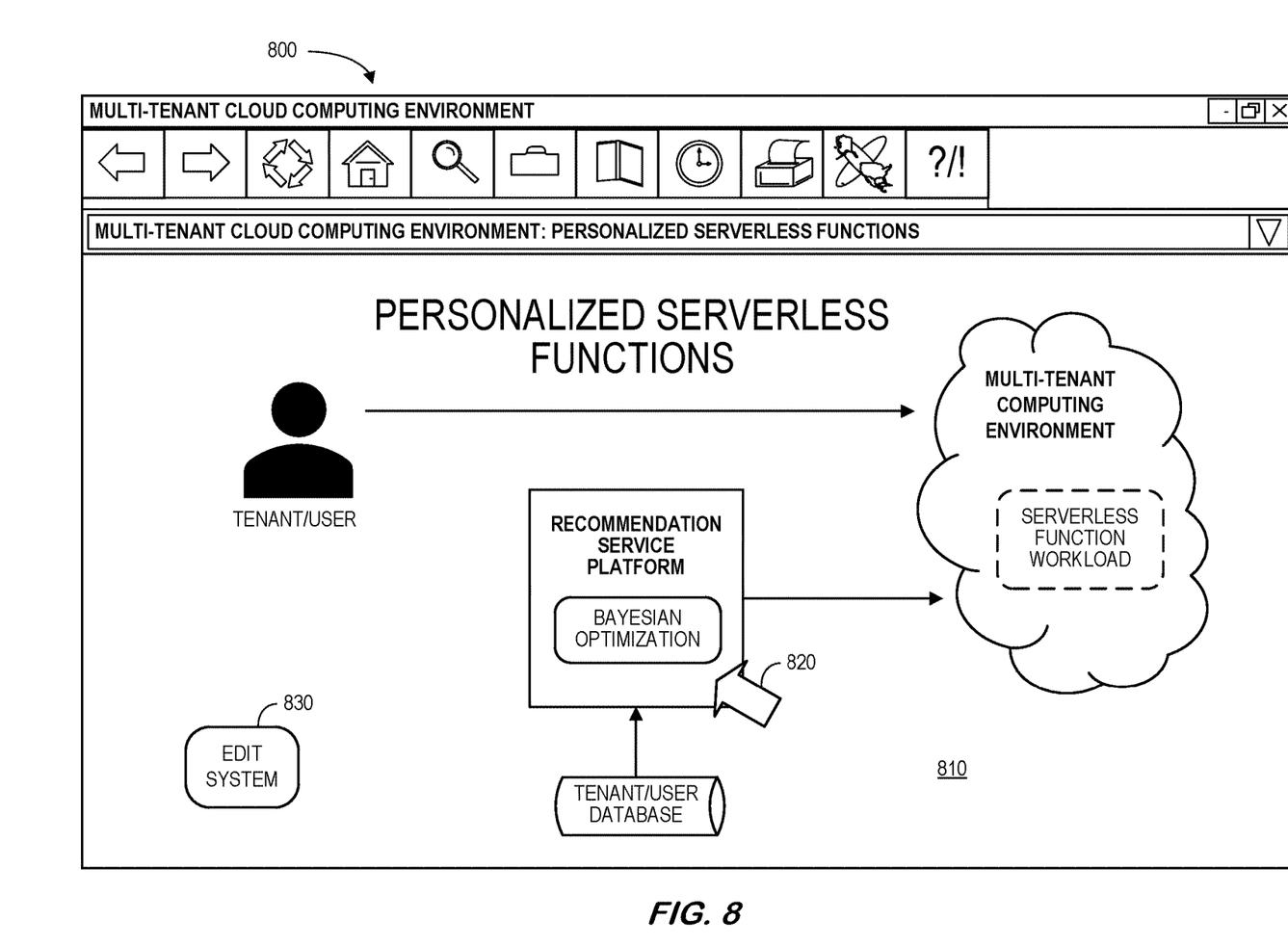
FIG. 8 is a human machine interface display according to some embodiments.

FIG. 8 is a human machine interface display 800 in accordance with some embodiments. The display 800 includes a graphical representation 810 or dashboard that might be used to manage or monitor a personalized serverless function system framework (e.g., associated with a cloud provider). In particular, selection of an element (e.g., via a touchscreen or computer mouse pointer 820) might result in the display of a popup window that contains configuration data. The display 800 may also include a user selectable "Edit System" icon 830 to request system changes (e.g., to investigate or improve system performance).

Figure 9:
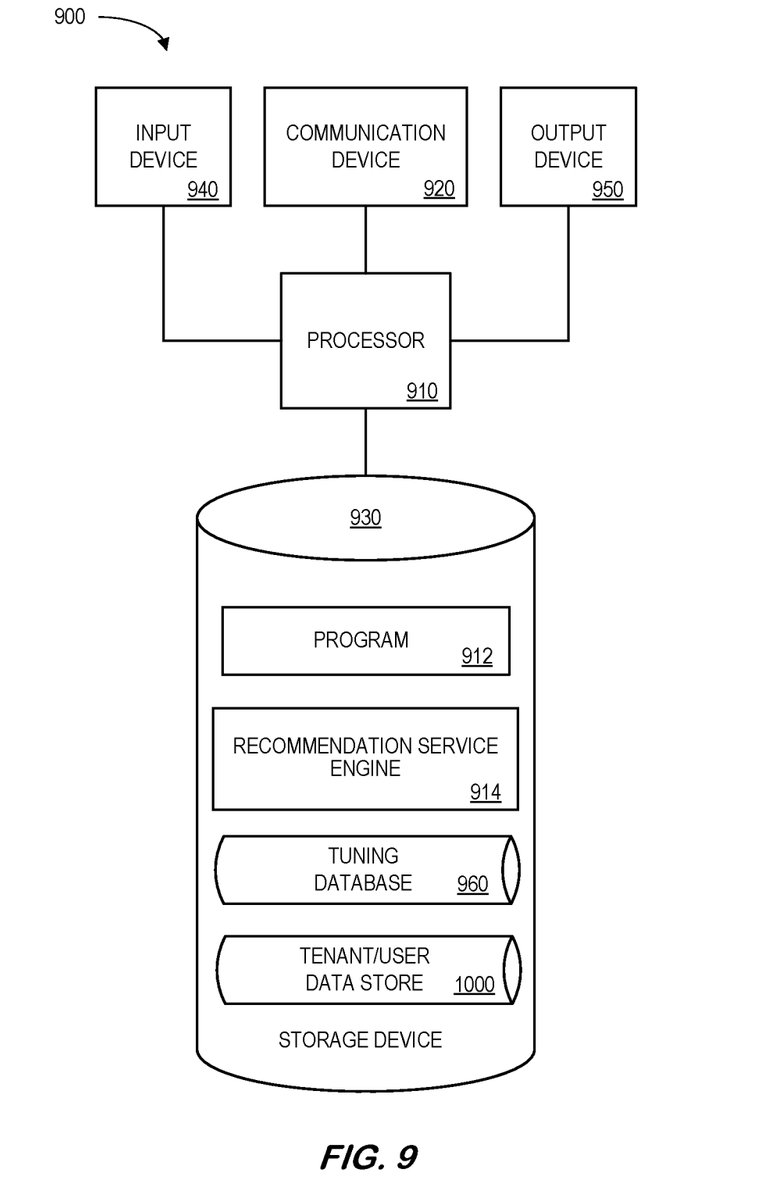
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the systems 100, 700 of FIGS. 1 and 7, respectively (and/or any other system described herein). The platform 900 comprises a processor 910, such as one or more commercially available CPUs in the form of one-chip microprocessors, coupled to a communication device 920 configured to communicate via a communication network (not shown in FIG. 9). The communication device 920 may be used to communicate, for example, with one or more remote user platforms, tenant data sources, etc. The platform 900 further includes an input device 940 (e.g., a computer mouse and/or keyboard to input information about optimization preferences) and an output device 950 (e.g., a computer monitor to render a display, transmit recommendations or alerts, and/or create serverless function reports). According to some embodiments, a mobile device and/or PC may be used to exchange information with the platform 900.

The processor 910 also communicates with a storage device 930. The storage device 930 can be implemented as a single database or the different components of the storage device 930 can be distributed using multiple databases (that is, different deployment information storage options are possible). The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or recommendation service engine 914 for controlling the processor 910. The processor 910 performs instructions of the programs 912, 914, and thereby operates in accordance with any of the embodiments described herein. For example, the processor 910 may facilitate automated personalized serverless functions in a multi-tenant cloud computing environment. The processor 910 may receive information about a serverless function workload (e.g., a NodeJS, Java function or ABAP workload) to be launched in the cloud computing environment. A tenant associated with the serverless function workload to be launched may be identified and, based at least in part on the identified tenant, an objective function (e.g., throughput, latency, cost, etc.) for the serverless function workload to be launched may be identified. The processor 910 may then iteratively configure tuning parameters of the cloud computing environment using Bayesian optimization (e.g., to reach a global optimum using a Gaussian process) and the determined objective function. The processor 910 may also arrange for the serverless function workload to be executed in the cloud computing environment in accordance with the configured tuning parameters.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores a tuning database and a tenant/user data store 1000. An example of a database that may be used in connection with the platform 900 will now be described in detail with respect to FIG. 10. Note that the database described herein is only one example, and additional and/or different information may be stored therein. Moreover, various databases might be split or combined in accordance with any of the embodiments described herein.

Figure 10:
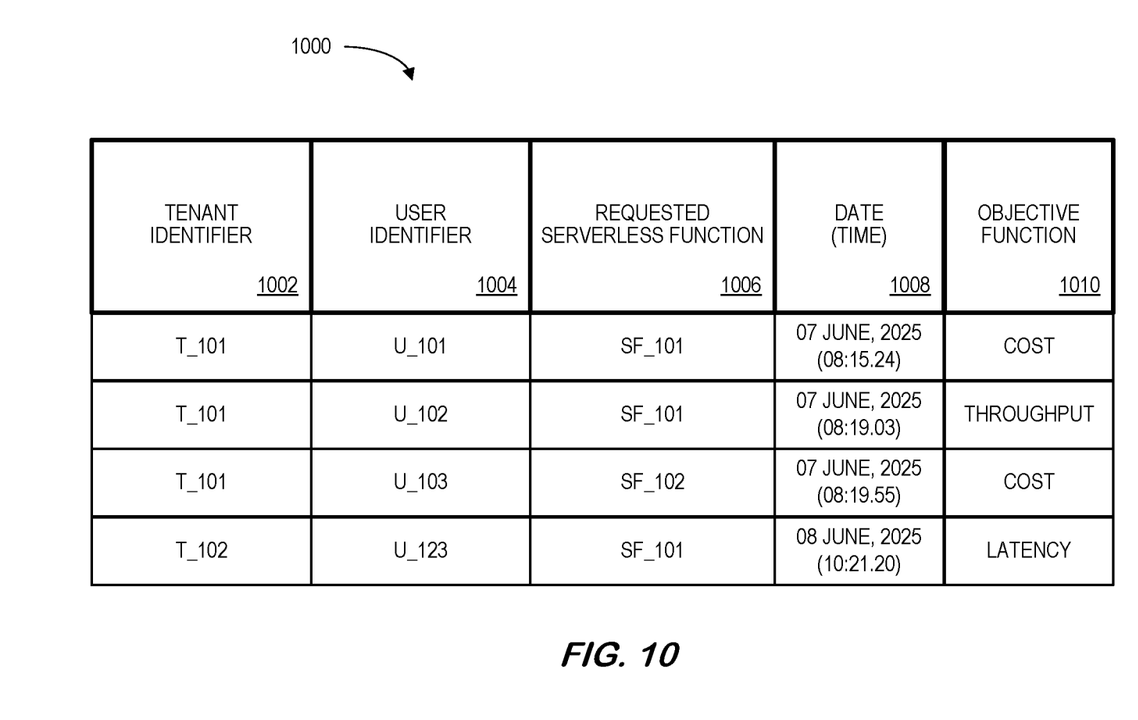
FIG. 10 illustrates a synthetic workload database in accordance with some embodiments.

Referring to FIG. 10, a table is shown that represents the tenant/user data store 1000 that may be stored at the platform 900 according to some embodiments. The table may include, for example, entries identifying tenants and/or users when may request serverless functions in a cloud computing environment. The table may also define fields 1002, 1004, 1006, 1008, 1010 for each of the entries. The fields 1002, 1004, 1006, 1008, 1010 may, according to some embodiments, specify: a tenant identifier 1002, a user identifier 1004, a requested serverless function 1006, a date and time 1008, and an objective function 1010. The tenant/user data store 1000 may be created and updated, for example, when a new tenant or user is added to the system, when optimization parameters are changed, etc.

The tenant identifier 1002 identifier 1002 might be a unique alphanumeric label or link that is associated with a particular "tenant" in a multi-tenant cloud computing architecture that lets customers share computing resources in a public or private cloud. Each tenant's data may be isolated and remain invisible to other tenants. In such a multi-tenant cloud system, tenants may have individualized space to store projects and/or data. The user identifier 1004 might represent a particular user associated with the tenant (e.g., when the tenant is a business customer the user might be an employee of the business). The requested serverless function 1006 and the date and time 1008 might be associated with a request received from the tenant/user (e.g., for a garbage collection service) and the objective function 1010 might identify one or more parameters that should be maximized (or minimized) for the serverless function.

In this way, embodiments may facilitate automated personalized serverless functions in a multi-tenant cloud computing environment in an efficient and accurate manner. Note that embodiments may cater to various cloud solutions and runtimes. Given the high demand to run software entities as serverless functions, business functions may be optimized with the appropriate technical and/or business configurations applied for the specific tenant and optimization function. Consider, for example, a tax calculation as a service which can be deployed as a function. This service might see specific demand patterns and specific business objectives (e.g., processing a particular number of tax returns per minute) which means that the service should be optimized for throughput. A recommender service in accordance with embodiments described herein may generate or tune a specific configuration for the tax service (keeping in context the noise it might experience due to certain uncertainties of the environment in which the service function executes).

Embodiments may also improve user friendliness by letting a serverless function be tuned automatically for a tenant (without needing a DBA) and reduce the response time for interactions and/or to complete operational tasks (e.g., to retrieve information from a database). According to some embodiments, an increase in growth and/or scale may be provided (e.g., because increased tuning accuracy may improve the quality of serverless functions) along with a reduced time to impact revenue (that is, serverless functions may be deployed more quickly). Moreover, an increase of business growth, productivity, efficiency, and quality may be provided by the various embodiments described herein.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
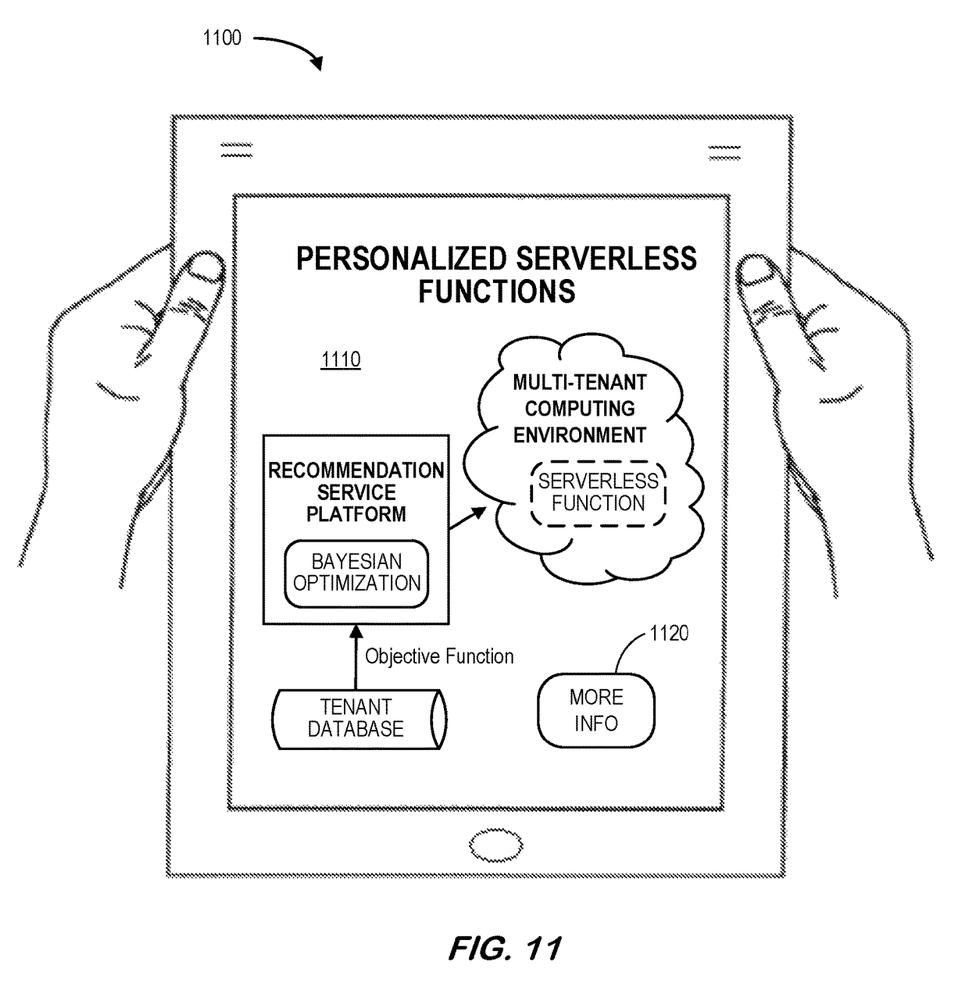
FIG. 11 illustrates a handheld tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of serverless functions, any of the embodiments described herein could be applied to other types of business functions. Moreover, the displays shown herein are provided only as examples, and any other type of user interface could be implemented. For example, FIG. 11 shows a handheld tablet computer 1100 rendering a personalized service functions display 1110 that may be used to monitor the performance of serverless function system framework components and/or to request additional information (e.g., via a "More Info" icon 1120).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a multi-tenant cloud computing environment, comprising:
   a communication port to receive information about a serverless function workload to be launched in the cloud computing environment; and
   a recommendation service platform, coupled to the communication port, including:
      a computer processor, and
      a computer memory, coupled to the computer processor, storing instruction that, when executed by the computer processor cause the recommendation service platform to:
         (i) identify a specific tenant associated with the serverless function workload to be launched,
         (ii) based on the identified specific tenant, determine an objective function for the specific tenant for the serverless function workload to be launched, the objective function being selected by a user,
         (iii) iteratively configure tuning parameters of the cloud computing environment using Bayesian optimization and based on the user-selected objective function for the identified specific tenant and the serverless function workload to be launched, and
         (iv) arrange for the serverless function workload to be executed in the cloud computing environment in accordance with the configured tuning parameters.

2. The system of claim 1, wherein the serverless function workload is associated with at least one of: (i) a Java function, (ii) a serverless runtime, (iii) a serverless database, (iv) a Node.js workload, and (v) an Advanced Business Language Application Programming ("ABAP") workload.

3. The system of claim 1, wherein the serverless function workload is associated with at least one of: (i) Kubernetes, (ii) containers, (iii) Virtual Machines ("VMs"), (iv) a unikernel, and (v) a Web assembly module.

4. The system of claim 1, wherein the selected objective function is associated with at least one of: (i) throughput, (ii) latency, (iii) Input Output characteristics, (iv) cost, (v) a request rate, (vi) an amount of time, and (vii) a ratio of parameters.

5. The system of claim 1, wherein the tuning parameters are associated with at least one of: (i) Central Processing Unit ("CPU") utilization, (ii) read Input Output ("IO") utilization, (iii) write IO utilization, (iv) memory utilization, (v) disk utilization, (vi) heap size, (vii) garbage collection parameters, (viii) a garbage collection type, (ix) a survivor ratio, (x) concurrent threads, (xi) parallel threads, and (xii) a new generation size.

6. The system of claim 1, wherein the Bayesian optimization reaches a global optimum using a Gaussian process.

7. The system of claim 1, wherein the tuning parameters are further configured based on context information about the serverless function workload and the cloud computing environment.

8. The system of claim 1, wherein the specific tenant is associated with multiple users, and the selected objective function is further determined based on a user associated with the serverless function workload to be launched.

9. A computer-implemented method associated with a multi-tenant cloud computing environment, comprising:
receiving information about a serverless function workload to be launched in the cloud computing environment;
identifying a specific tenant associated with the serverless function workload to be launched;
based on the identified specific tenant, determining an objective function for the specific tenant for the serverless function workload to be launched, the objective function being selected by a user;
iteratively configuring, by a recommendation service platform, tuning parameters of the cloud computing environment using Bayesian optimization and based on the user-selected objective function for the identified specific tenant and the serverless function workload to be launched; and
arranging for the serverless function workload to be executed in the cloud computing environment in accordance with the configured tuning parameters.

10. The method of claim 9, wherein the serverless function workload is associated with at least one of: (i) a Java function, (ii) a serverless runtime, (iii) a serverless database, (iv) a Node.js workload, and (v) an Advanced Business Language Application Programming ("ABAP") workload.

11. The method of claim 9, wherein the serverless function workload is associated with at least one of: (i) Kubernetes, (ii) containers, (iii) Virtual Machines ("VMs"), (iv) a unikernel, and (v) a Web assembly module.

12. The method of claim 9, wherein the selected objective function is associated with at least one of: (i) throughput, (ii) latency, (iii) Input Output characteristics, (iv) cost, (v) a request rate, (vi) an amount of time, and (vii) a ratio of parameters.

13. The method of claim 9, wherein the tuning parameters are associated with at least one of: (i) Central Processing Unit ("CPU") utilization, (ii) read Input Output ("IO") utilization, (iii) write IO utilization, (iv) memory utilization, (v) disk utilization, (vi) heap size, (vii) garbage collection parameters, (viii) a garbage collection type, (ix) a survivor ratio, (x) concurrent threads, (xi) parallel threads, and (xii) a new generation size.

14. The method of claim 9, wherein the Bayesian optimization reaches a global optimum using a Gaussian process.

15. The method of claim 9, wherein the tuning parameters are further configured based on context information about the serverless function workload and the cloud computing environment.

16. The method of claim 9, wherein the specific tenant is associated with multiple users, and the selected objective function is further determined based on a user associated with the serverless function workload to be launched.

17. A non-transitory, computer readable medium having executable instructions stored therein to perform a method associated with a multi-tenant cloud computing environment, the medium comprising:
instructions to receive information about a serverless function workload to be launched in the cloud computing environment;
instructions to identify a specific tenant associated with the serverless function workload to be launched;
based on the identified specific tenant, instructions to determine an objective function for the specific tenant for the serverless function workload to be launched, the determined objective function being selected by a user;
instructions to iteratively configure, by a recommendation service platform, tuning parameters of the cloud computing environment using Bayesian optimization and based on the user-selected objective function for the identified specific tenant and the serverless function workload to be launched; and
instructions to arrange for the serverless function workload to be executed in the cloud computing environment in accordance with the configured tuning parameters.

18. The medium of claim 17, wherein the serverless function workload is associated with at least one of: (i) a Java function, (ii) a serverless runtime, (iii) a serverless database, (iv) a Node.js workload, and (v) an Advanced Business Language Application Programming ("ABAP") workload.

19. The medium of claim 17, wherein the serverless function workload is associated with at least one of: (i) Kubernetes, (ii) containers, (iii) Virtual Machines ("VMs"), (iv) a unikernel, and (v) a Web assembly module.

20. The medium of claim 17, wherein the selected objective function is associated with at least one of: (i) throughput, (ii) latency, (iii) Input Output characteristics, (iv) cost, (v) a request rate, (vi) an amount of time, and (vii) a ratio of parameters.

* * * * *